United States Patent [19]

Calvignac et al.

[11] Patent Number: 4,760,573
[45] Date of Patent: Jul. 26, 1988

[54] MULTIPLEX INTERFACE FOR A COMMUNICATION CONTROLLER

[75] Inventors: Jean L. J. Calvignac; Jacques M. Clement Feraud, both of LaGaude; Jean-Marie L. Munier, Cagnes sur Mer, all of France

[73] Assignee: International Business Machines Corp., Armonk, N.Y.

[21] Appl. No.: 930,164

[22] Filed: Nov. 13, 1986

[30] Foreign Application Priority Data

Dec. 4, 1985 [EP] European Pat. Off. ......... 85430041.5

[51] Int. Cl.$^4$ .................................................. H04J 3/16
[52] U.S. Cl. .......................................... 370/55; 370/99
[58] Field of Search .................... 370/95, 99, 85, 110.1

[56] References Cited

U.S. PATENT DOCUMENTS 4,530,088  7/1985  Hamston et al. ................. 370/110.1
4,665,517  5/1987  Widner ............................ 370/110.1

*Primary Examiner*—Douglas W. Olms
*Assistant Examiner*—Frank M. Scutch, III
*Attorney, Agent, or Firm*—John B. Frisone

[57] ABSTRACT

A multiplex interface for interconnecting the line scanning means (1) of a communication controller to user lines via transmit and receive synchronous multiplex links. Both data and control bits are exchanged in synchronous frames wherein at least two slots are assigned to each user line, the structure of the two slots is identical for all types of user lines and includes an n-bit data slot having a variable number x of valid bits depending upon the line speed of the user line assigned to the data slot and indicated by a variable delimiter pattern comprising a first delimiting bit set at a first binary value (1) adjacent to the data bits and (n−x−1) bits set at the second binary value (0) adjacent to said first delimiting bit, and an n-bit control slot having a first bit used as a global validation bit in case the data slot comprises n valid bits (x=n), this bit being set at the first binary value (1) when the data slot comprises n valid bits and at the second binary value (0) if it comprises less than n valid bits, and the n−1 following bits are used for exchanging control information.

10 Claims, 15 Drawing Sheets

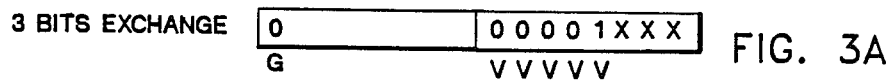
FIG. 3A
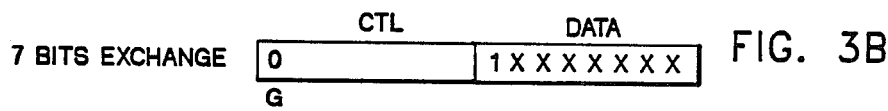
FIG. 3B
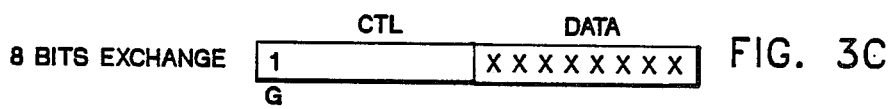
FIG. 3C
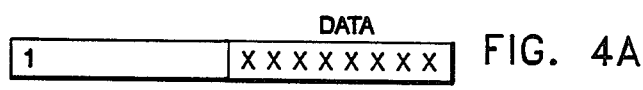
FIG. 4A
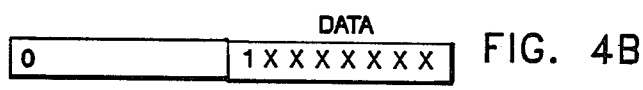
FIG. 4B
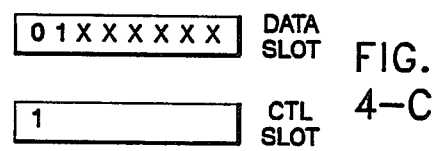
FIG. 4-C
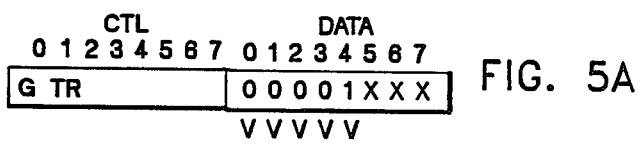
FIG. 5A
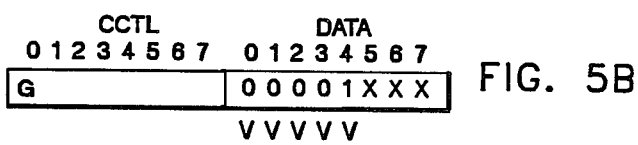
FIG. 5B
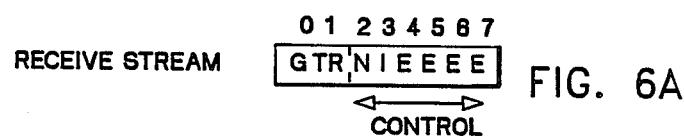
FIG. 6A
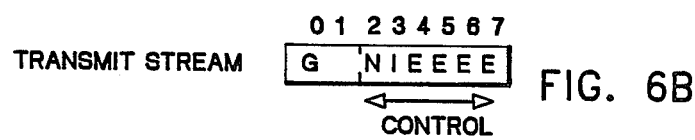
FIG. 6B

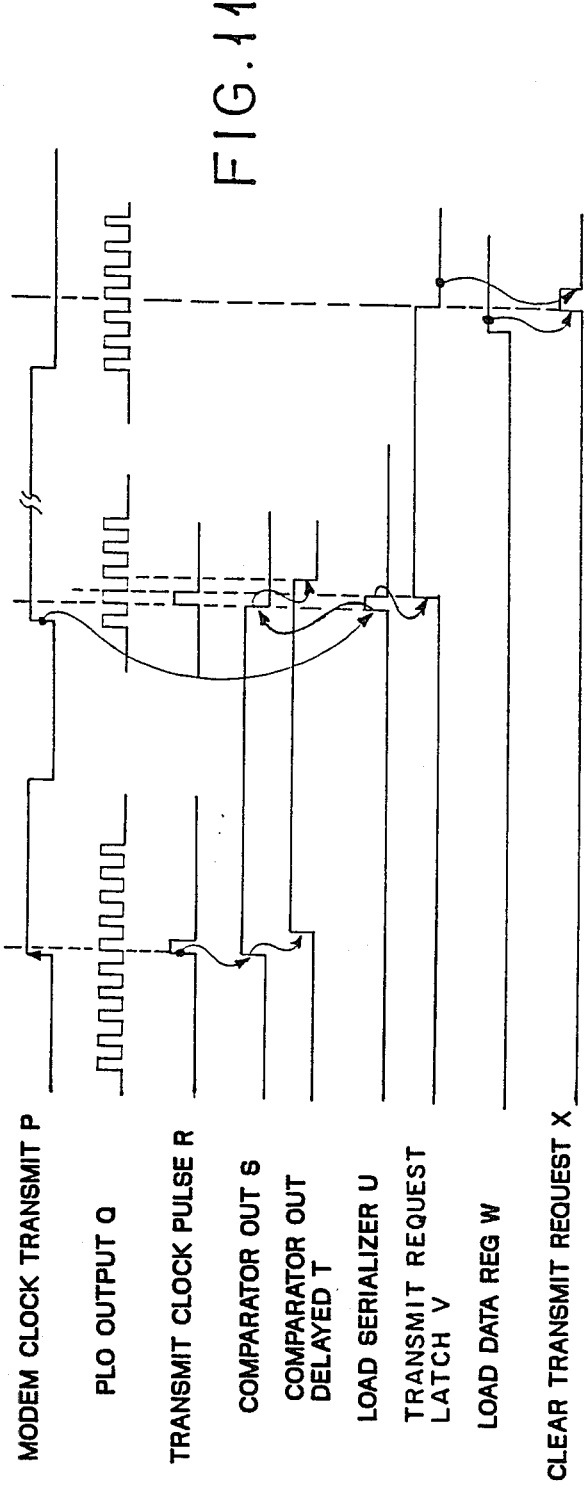

MULTIPLEX INTERFACE FOR A COMMUNICATION CONTROLLER

DESCRIPTION OF THE INVENTION

1. Field of the Invention

This invention relates to a multiplex interface for the line scanners of a communication controller, allowing the communication controller to be connected to any type of physical or logical attachments.

To day, the communication controller may be connected to physical attachments such as modems or network standard data interfaces such as V24, V35, Bell 303, X21 or any local attached interface working at any speed or to logical attachments such as Time Division Multiplex links (T1, CEPT (Conférence Européenne des Postes et Télécommunications) first order multiplex, Integrated Service Digital Network ISDN basic access, ISDN extended access) or to PBX interfaces.

2. Background Art

Patent Application EU-A No. 0 077 863 described a line adapter to be used in a communication controller. This line adapter presents one drawback. Since it has to be connected to a plurality of users through line connectors having a quite large size, the adapters are distant from each others and thus the bus connecting them to the Central Control Unit is long which causes the transit delays on the bus to be long and the performances of the Communication Controller to be degraded.

Furthermore, such a line adapter cannot accommodate user lines at a speed higher than 256 kilobits per second.

SUMMARY OF THE INVENTION

An object of this invention is to provide the line scanners of the communication controller with a multiplex interface which allows the communication controller to be connected to any type of users.

Another object of the invention is to provide such a multiplex interface which allows the performance of the communication controller to be improved.

The multiplex interface according to the invention is to be connected to the scanning means of a communication controller in order to exchange data and control bits between the line scanning means and the user attached to the communication controller.

It comprises transmit and receive synchronous multiplex links connecting the line scanning means to the users through multiplexing means, the data and control bits being exchanged on the transmit and receive multiplex links in synchronous frames wherein at least two slots are assigned to each user, the structure of the two slots being identical for all types of users and comprising:

a n-bit data slot which includes a variable number x of valid bits depending upon the line speed of the user information carrying medium (line or multiplex link) assigned to the data slot, said number being indicated by a variable delimitation pattern comprising a first delimiting bit set at a first binary value (1) adjacent to the data bits and (n−x−1) bits set at the second binary value (0) adjacent to said first delimiting bit, and a n-bit control slot wherein a first bit is used as global validation bit in case the data slot comprises n valid bits (x=n), this bit being set at the first binary value (1) when the data slot comprises n valid bits and at the second binary value (0) if it comprises less than n valid bits, and the n−1 bits being used for exchanging control information.

BRIEF DESCRIPTION OF THE FIGURES

FIGS. 3A through 3C represent the link entities in cases of a 3-valid bit exchange, a 7-valid bit exchange and an 8-valid bit exchange.

FIGS. 4A and 4B show the link entities in case of an 8-bit exchange and a 7-bit exchange for a logical 64 kbps user and a 56 kbps user, and FIG. 4-C shows the data and control slots in case of low speed users.

FIGS. 5A and 5B show the receive stream and the transmit stream respectively with only the control information required for the data transfer.

FIGS. 6A and 6B show the control slots for the receive stream and the transmit stream respectively.

FIGS. 8, 8a and 8b show the receive part of the line interface circuit.

FIGS. 10, 10a and 10b the transmit part of the line interface circuit.

FIG. 11 shows the timing diagram of the transmit part of the line interface circuit.

DETAILED DESCRIPTION OF THE INVENTION

Figure 1:
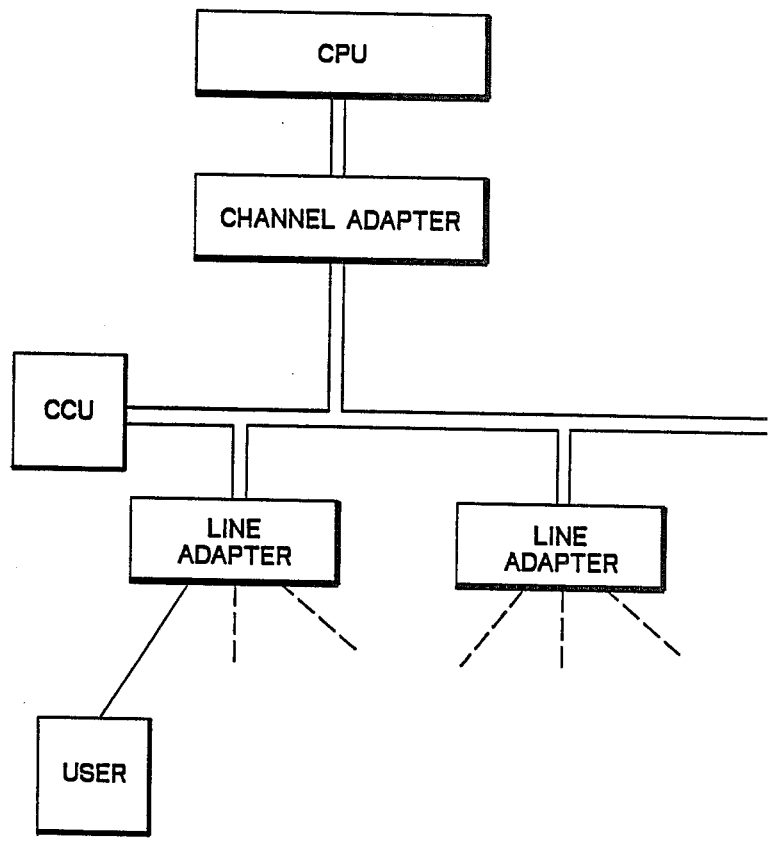
FIG. 1 shows schematically a communication controller wherein the present invention may be embodied.

As described in European Patent Application No. 81430037.2 filed on Oct. 28, 1981 and published under No. 0 077 863, a communication controller comprises as schematically represented in FIG. 1, a central control unit CCU connected on the one hand to communication lines through line adapters and on the other hand to central processing units through channel adapters. The line adapters serve at least one user line by means of a cyclic scanning device and a random access memory assembly containing the data received or to be sent on the various lines as controlled by the scanning device.

Figure 2:
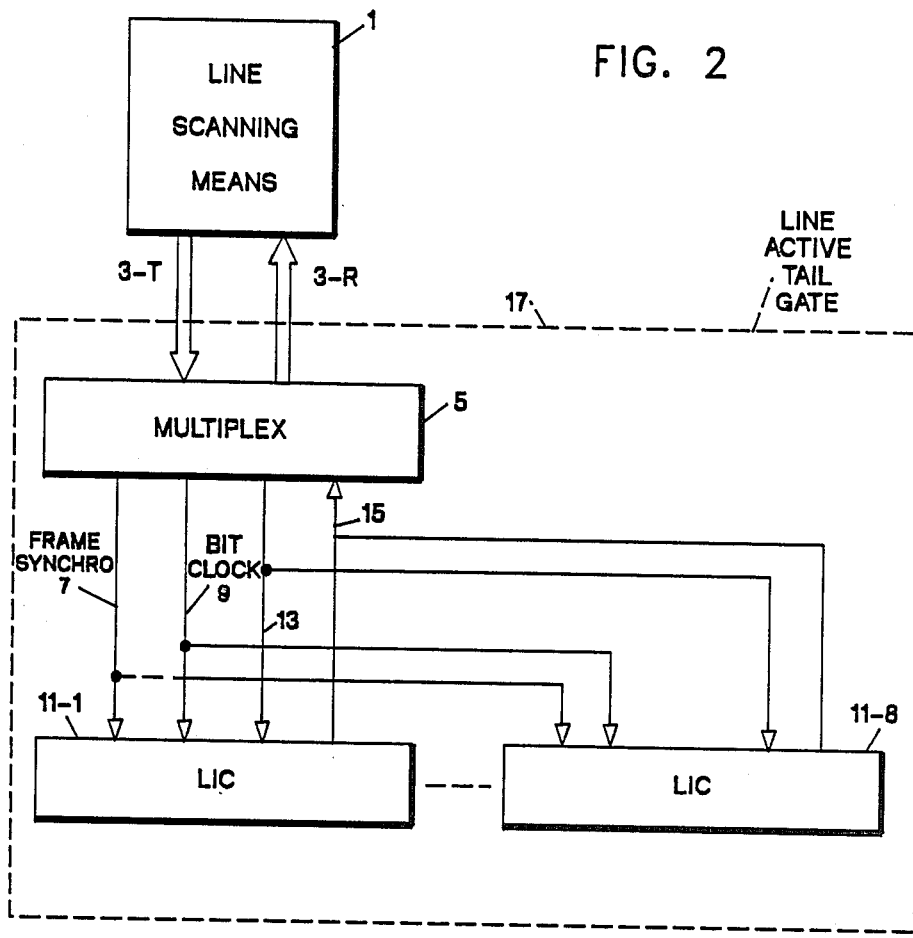
FIG. 2 shows the block diagram of the line adapter incorporating the multiplex interface according to the present invention.

The line adapter according to the present invention is schematically shown in FIG. 2. It is comprised of line scanning means 1 which are similar to the line scanning means such as described in above patent application except that a full duplex link 3 is provided at the output of the line scanning means. A slot or a plurality of slots, is assigned to each user connected to the adapter so that the data and control bits from/to the line users are exchanged in said slots on synchronous links 3R and 3T.

The succession of slots assigned to the users attached to an adapter constitutes a frame.

Link 3 is connected to multiplexing device 5 which generates from the bits received from line scanning means 1, a frame synchronization signal on line 7 and a bit clock signal on line 9 and transmits the data and control bits from the transmit link 3-T to line interface circuits LIC 11 through line 13. It is assumed that there are eight LIC circuits numbered 11-1 to 11-8. This allows to attach from one line at up to 2 megabits per second to thirty two physical or logical channels at up to 64 kilobits per second.

The bits received from the users through line interface circuits 11 are transmitted to multiplexing circuit 5 which provides them through receive link 3-R, to line scanning means 1.

Thanks to the provision of the serial link 3, line interface circuits 11 may be apart from the communication controller in a separate active tail gate enclosure 17. Thus the transit delay on the bus connecting the adapters to the CCU is reduced in a significant way, since the bus length is reduced due to the fact that the line adapters may be close together since there is only one connection to the link 3.

According to the present invention, elementary entities called link offerings or link slots allow several types of information (data and control) to be carried. The structure of these entities which is shown in FIGS. 3 to 6 is determined in such a way that they can be used easily in terms of cost and efficiently in terms of thruput by the various types of attachments. For a given attachment, the line interface circuit is in charge of transforming the link entities into information fitting this particular attachment interface, and vice-versa. The amount of transformation functions must be minimum. The structure of the entities is driven by cost and performance machine requirements rather than external considerations, such as an optimized link bandwidth or a compatibility with a standardized link structure.

The link must carry three types of information:
Data and service bits
External interface control (In and Out)
LIC/Multiplex internal control For exchanging data and service bits a basic principle is to let LIC circuits 11 be responsible for bit clocking. This service information is either derived from clock signals provided by the attachments or internally generated by the LIC circuits 11. This allows the line scanning means to be relieved from the handling of the various clocking types of the low-speed attachments.

The valid data bits between active tail gate 17 and line scanning means 1 could be exchanged in different ways according to the known techniques, as described hereafter.

Valid data bits may be placed into blocks, delimited by some types of flags. This approach is used in the so called Digital Multiplex Interface DMI proposed by A. T. T. (Described in Digital Multiplex Interface Specification AT & T Information Systems, Mar. 5, 1984) the blocks being similar to HDLC frames. This would allow a large variety of attachment speeds to be accommodated but would have a serious cost drawback at both active tail gate and line scanning means sides in terms of buffering capability and block handling.

Data may be individually be validated by service bits: Receive service RS and transmit request TR bits may be generated by LIC circuits. This would lead to the following structure for each link offering:

inbound active tail gate to scanning means R RS TR
outbound scanning means to active tail gate T R is the receive data bit and T is the transmit data bit.
RS=1 means that the present R-bit is valid and must be taken by the line scanning means. RS=0 means that the present link offering does not carry any valid data bit.

TR=1 means that a new data bit is requested by the active tail gate. The T data bit of the next offerings relative to this channel will contain a valid transmit data bit. The line scanning means must serve the bit requested by the active tail gate before the next active tail gate request to avoid underrun conditions. The active tail gate can thus systematically takes the transmit bit into account each time it requests a new bit, thus eliminating the need to validate the T-bit.

TR=0 means that the active tail gate does not request any data bit.

Such an offering scheme based on the transfer of single bits, would introduce a ratio of 3 between offering bits R, TR, RS and valid data bits. This is not acceptable for high speed attachments, as this implies a too high data rate on the link.

A byte offering structure would require less overhead, but it would be necessary to indicate how many data bits are valid in this present offering, from 0 to 5. This would systematically waste 3 bits out of 8 and limit the maximum usable speed to 40 kbps for an offering speed of 64 kpbs.

According to the Computer to PBX Interface CPI specifications, developed by Digital Equipment Corp DEC and Northern Telecom Inc NT, and described in PBX Systems proposal for an enhanced, $\mu$-low Interface for the transmission of data (CPI), Digital Equipment Corp. (DEC) Northern Telecom Inc. (NT) March 1984 data bits could be buffered until a predetermined number of them forming a character are ready to be carried in a link offering at 64 kbps. This means that it is necessary to distinguish between empty and valid bit slots by using one bit per offering for that purpose. Thus the maximum allowable speed is limited to 56 kbps and data buffering is needed for each channel. Furthermore, this kind of data transfer suffers important delay distortions.

To overcome this drawback, the present invention makes use of a dynamic variable data delimitation pattern which allows data bits to be transferred in each link offering in the following way:

| offering bit position | 0 | 1 | 2 | 3 | 4 | 5 | 6 | 7 |
|---|---|---|---|---|---|---|---|---|
| no bit valid | 0 | 0 | 0 | 0 | 0 | 0 | 0 | 1 |
| 1 bit X valid | 0 | 0 | 0 | 0 | 0 | 0 | 1 | X |
| 2 bit X valid | 0 | 0 | 0 | 0 | 0 | 1 | X | X |
| 3 bit X valid | 0 | 0 | 0 | 0 | 1 | X | X | X |
| 4 bit X valid | 0 | 0 | 0 | 1 | X | X | X | X |
| 5 bit X valid | 0 | 0 | 1 | X | X | X | X | X |
| 6 bit X valid | 0 | 1 | X | X | X | X | X | X |
| 7 bit X valid | 1 | X | X | X | X | X | X | X |

The configuration 0..01 preceding the valid data bits is called the variable delimitation pattern or variable delimiter. Thus, the line scanning means knows the number of valid data bits received in one link offering in the following way. The first bit (position 0) is analyzed. If it is found at 1, the following bits are taken as valid data bits. If it is found at 0, the following bit (position 2) is analyzed. If it is found at 1, the following bits are taken as valid data bits if not the following bit (position 3) is analyzed, and so on . . . A data delimiter having the inverted configuration 1..10 has the same property.

For 8 valid bits, a global validation bit is needed as will be described later on.

For physical channels at up to 64 kpbs, two 64 kbps slots are needed on the link 3 for each physical line, i.e. one data slot and one control slot. Each user has an offering of a two slot period at regular time intervals and the data slot when offered to the user is filled with the available data bits, the location of the delimiter bits 0..01 indicates the number of valid bits.

Most of the bits in the control slot will be described later on, but one bit called the global validation bit or G bit indicates whether the whole data slot is valid (G=1) or not (G=0). FIGS. 3-A, 3-B and 3-C represent the G-bit in the control slot and the data slot in cases of a 3-bit exchange, a 7-bit exchange and an 8-bit exchange. With such a structure, 32 users at 64 kbps or less use 64 slots at 64 kbps.

Logical channels are based on 64-kbps digital slots multiplexed into external multiplex links connected to the LIC circuits.

In case of a 64 kbps clear channel, no external control information must be carried on a channel basis. FIG. 4-A shows the structure of the link slot in that case. The global validation bit G=1 is permanently provided in the control slot which may also be used for exchanging internal control information or diagnostic information. This information is coded as will be described in reference to FIG. 6-A and 6-B.

It is to be noted that data are exchanged by bytes on both the external multiplex links and link 3.

FIG. 4-B shows the data slot in case of a 56 kbps clear channel. The global validation bit G=0 is permanently provided in the control slot and there are 7 valid bits in the data slot. With such a structure 32 logical users at 56 kbps use 64 slots at 64 kbps.

FIG. 4-C shows the data and control slots in case of modem, terminal, network interfaces carried by 64 kbps slots. For such low speed attachments, up to 24 kbps, the same link offering is used to carry data or control information alternatively, i.e. every second slot relative to a given channel. The first bit in the slot distinguishes between data (first bit=0) and control (first bit=1). The variable validation delimiter is used in the data slots, and the example shown in FIG. 4-C corresponds to valid entities of 6 bits. This shows that data and control slots have the same structure as in the general case in which two consecutive slots are used and the control slot identification is made through the G bit which is set at 1. With such a structure, 64 users at 24 kbps or less use 64 slots at 64 kbps (this includes the conventional 19.2 kbps users).

For each channel, the receive stream on the link 3-R looks as shown in FIG. 5-A wherein only the information required for the data transfers is represented.

G is the global validation bit
G=0 see variable validation delimiter in the data slot
G=1 8 bits of the data slot are valid
TR (Transmit Request) is set by the active tail gate 17 transmit leg to request a new data slot.
TR=1: transmit data slot requested
TR=0: no request
V-bits constitute the variable delimiter
X-bits are the valid data bits For each channel, the transmit stream on link 3-T looks as shown in FIG. 5-B. G, V, and X have the same meaning as on the receive stream. The maximum number of valid bits to be transmitted (X-bits) is known by the line scanning means at the initialization time according to the type of users connected to the line interface circuits.

The six remaining bits in the control slot are used for carrying the internal control information which can be continuously provided or specifically requested by the line scanning means 1 and external interface control information which must be exchanged with a higher rate than the internal control information, especially error and parity indications.

The control slot structures for the receive stream and for the transmit stream are shown in FIGS. 6-A and 6-B respectively.

Bit N is used for the control slot numbering.
I is used as an internal control bit
E are used as external control bits.

Once one or several link offerings have been allocated to a given physical or logical channel, the portion of the link bandwidth relative to this channel, i.e. the ratio between the slots allocated to this channel and the total number of slots will be referred to as the link subchannel.

The N-bit allows a modulo n framing mechanism. There is one N-bit per link subchannel, the N-bit being ON in one transmit control slot out of 8 allows to provide on the I-bit the address of an active tail gate 17 resource usually a register, to be read on the subsequent receive control slots relative to this channel. In this case, the address is provided at a rate of one bit per slot, similarly the contents of the addressed register is given at the rate of one bit per slot, the N-bit is also ON in one receive control slot out of 8.

Similarly, if the N-bit is ON in one transmit control slot out of 16, the 8 first values of the I-bit of the transmit control slot provide the address of an active tail gate 15 resource to be loaded, the 8 next values give the pattern to be loaded into that resource.

Similarly, if this bit is ON in one receive/transmit control slot out of 64, 8 active tail gate 17 resources of 8 bits each can be permanently read/written at a rate of one bit per slot. The addresses of the 8 resources are supposed to be implicitly known.

When users are connected to the line interface circuits through modems, bit-N allows to present the modem-in or modem-out information i.e. 6 bits for V.24 interface on two control slots of a given link subchannel, 4 bits at a time placed on the E-bits.

Similarly, as far as error isolation is concerned, the N-bit can indicate that the I-bit carries a parity bit or a bit of a CRC pattern (CRC=cyclic redundancy code), calculated on data and/or control bits.

As an example, a CRC pattern can be carried on 16 slots of a given link subchannel, this CRC being calculated on 1 024 data bits.

Figure 7:
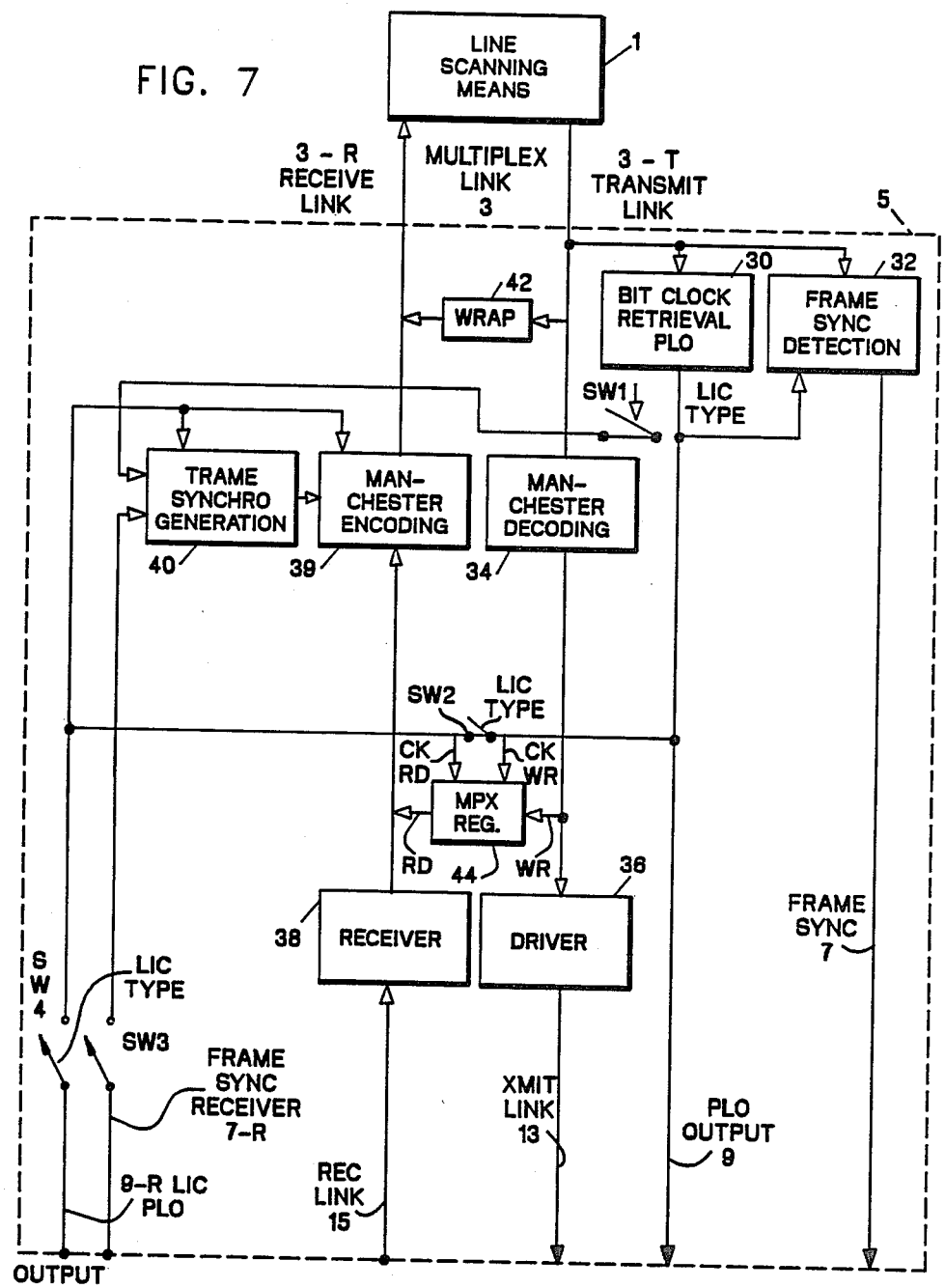
FIG. 7 shows the block diagram of the multiplexing circuit.

FIG. 7 represents the block diagram of the multiplexing circuit 5. It is connected to line scanning means 1 through interface multiplex transmit and receive links 3-T and 3-R carrying the link entities having the configurations described in reference to FIGS. 3 to 6. The entities (control slots and data slots) relative to the users attached to line scanning means 1 constitutes a frame. A phase lock oscillator PLO 30 receives the bit stream to be transmitted from Xmit serial link 3-T and provides on line 9, a signal the frequency of which is twice the bit frequency on link 3-T, for example, it is assumed that the bit frequency is equal to 4.096 megahertz so that the PLO output signal has a 8.192 megahertz frequency.

This is due to the fact that Manchester coded bits are processed by the line scanning means and that the Manchester code provides in one bit period the true bit value and its complement.

A frame synchro detection circuit 32 generates the frame synchro signal on line 7 from the bit stream on link 3-T and from the output of the phase lock oscillator 30. The bit stream to be sent to line interface circuits 11 on line 13, from the transmit link 3-T is decoded in Manchester decoding circuit 34 and provided to line 13 through driver 36.

When the line scanning means is connected to physical or logical user lines except a multiplex line of the T1 type for example, switches SW1 and SW2 are close, since in that case the same synchro signal is used in the receive and the transmit parts of the line interface circuits. If the line scanning means is connected to a T1 multiplex line, these switches are open and switches SW3 and SW4 which were normally open are closed, and the line interface circuit provides a LIC PLO signal on line 9-R and a frame synchronization signal on line 7-R. This allows to have a perfect synchronism between the channels on the T1 line and the two-slots periods on the multiplex link 3. This will be explained later on in reference to FIGS. 15 and 16.

The bit stream is received from line interface circuits 11 through line 15 by receiver 38 and coded in Manchester encoding circuit 39 to be provided on link 3-R. Frame synchronization generating circuit 40 performs a Manchester code violation to send the frame synchro information to line scanning means 1 in order that the slots assigned to the plurality of users may be retrieved in line scanning means 1. When switch SW1 is closed frame synchronization generation circuit 40 receives the PLO output signal from PLO 30. When switch SW1 is open and switches SW3 and 4 are closed, circuit 40 is actuated by the frame synchro receive signal on line 7-R and the LIC PLO output signal on line 9-R. Circuit 42 allows the wrap test of the link 3 to be made. This is done by connecting the transmit link to the receive link.

Multiplexing circuit 5 comprises internal registers 44 in which line scanning means 1 may cause I-bits to be written through the write line WR at the output of decoding circuit 34. These I-bits are placed in control slots assigned to multiplexing circuit 5.

The content of registers 44 is read by line scanning means 1 though line RD connected at the input of encoding circuit 39.

Registers 44 are shifted under control of the output signal from phase locked oscillator PLO 30 at the link clock rate which is derived from the phase locked oscillator 30 when switch SW2 is closed. When this swich is open in the case line scanning means 1 is connected to multiplex line (T1), the data in register 44 are written under control of PLO output signal on line 9 and are read under control of the LIC PLO output signal on line 9-R.

This multiplexing circuit will not be described in more details since it has only for a function to make the interface between line interface circuits 11 and line scanning means 1, i.e. it receives the control and data slots from the line interface circuits and builds therefrom the succession of frames to be transmitted to line scanning means 1. Furthermore it causes the succession of frames to be sent through line 13 to the line interface circuit.

It will now be described in reference to FIG. 8, the receive part of a line interface circuit which is connected to physical users through a modem. In the line interface circuits connected to logical users, the data input means are different and another type of line interface circuit will be described later on.

The function of the receive part of each line interface circuit 11 is to generate from the bits received from the line users attached to it, entities having the configuration shown in FIGS. 5-A and 6-A.

Line interface address signals A0, A1 and A2 and a LIC type signal on line 51 are provided to slot decoder 50. In FIG. 8 it is assumed that the LIC type signal indicates that the line interface circuit is connected to four physical line users. Slot decoders has four output lines 52-1 to 52-4. The signal on each one of these output lines is active during the period including the data and control slots assigned to one user connected to the line interface circuit. For example, assuming that four users are connected to the line interface circuit, the signal on the output line 52-1 is active during the period assigned to line 1 user, the signal on output line 52-2 is active during the period assigned to line 2 user, and so on . . .

Circuit 54 comprises flip flop circuit 56 activated by the signal from output line 9 from the multiplexing circuit, byte counter 58 and slot counter 60. Circuit 56 provides pulses at the bit clock frequency as shown in C in timing diagram of FIG. 9, from the PLO output signal shown in F. Byte counter 58 counts eight bit periods which correspond to the duration of a slot. The slots are counted by counter 60 which is reset by the frame synchro signal on line 7. In the case where there are eight line interface circuits 11-1 to 11-8 and where each line interface circuit may be connected to four users, there are 64 slots in a frame, i.e., 32 data slots and 32 control slots. Thus counter 60 counts up to 64.

Output 62 of slot counter 60 is compared with the slot number decoded by decoder 50 in comparing circuit 64. Comparing circuit 64 has four outputs 66-1 to 66-4 which are active during the time periods (including the data and control slots) assigned on serial ink 3-R to the line users 1, 2, 3, 4 connected to the line interface circuit.

The data are received from the modem by means of receiver 68, the modem clock receive signal (shown in A in FIG. 9) generated by the modem interface is provided through receiver 70 to the clock CK input of D-latch 72. The data in bits are provided through receiver 68 to the D-input of D-latch 72 acting as a one bit buffer.

Figure 9:
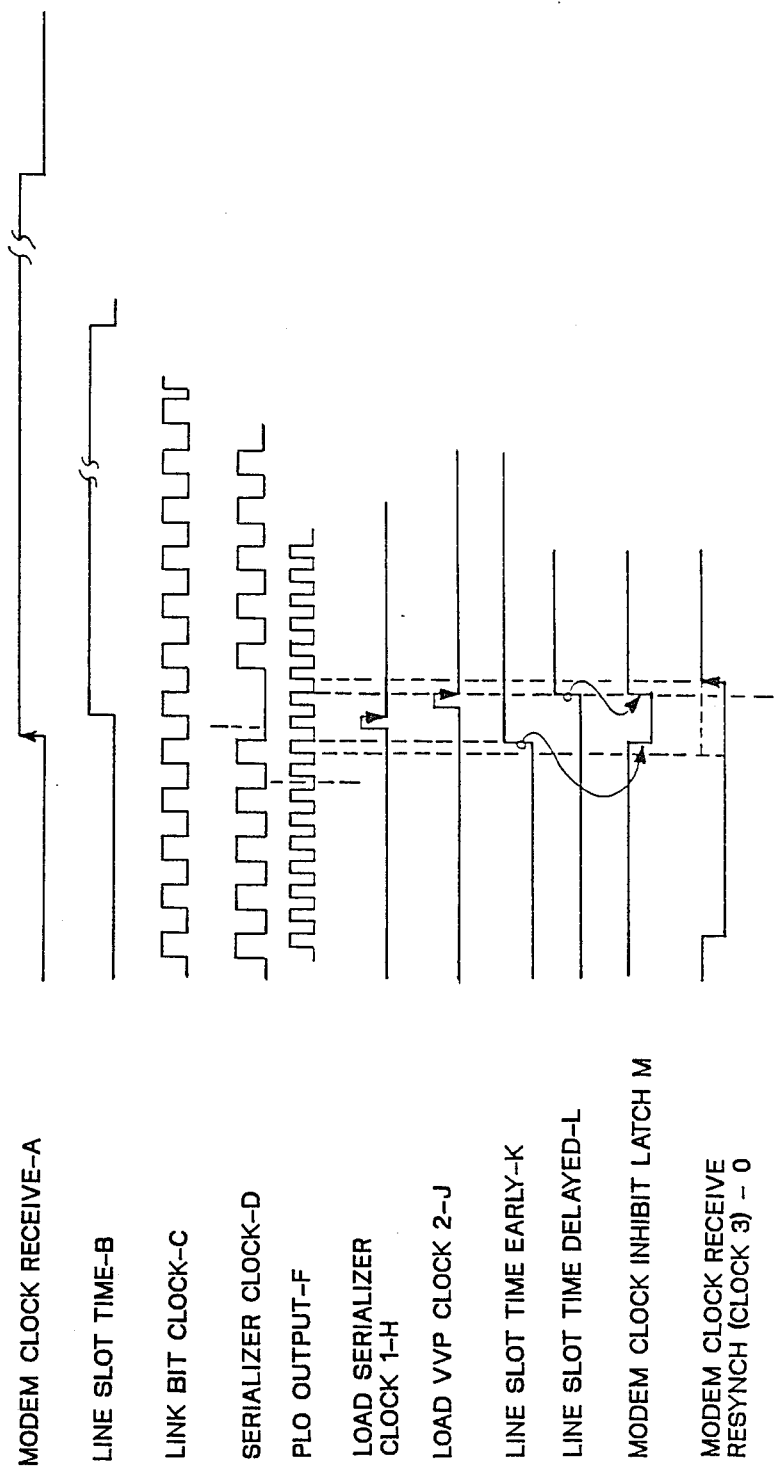
FIG. 9 shows the timing diagram of the receive part of line interface circuit shown in FIG. 8.

Contention logic 74 generates three clock signals shown in H, J and O in FIG. 9. These signals are derived from the line 1 slot time signal on line 66-1 which is active during the period assigned to line user 1 and from the modem receive clock B.

The purpose of this logic 74 is to synchronize the data bits received from the modem with the data slot time allocated to the line user to prevent a received bit from being lost. This is done by handling the contention between the modem clock receive and the data slot time allocated to the line in such a way that no data bit is lost.

Three registers 76, 78 and 80 are provided. Shift register 76 is the data slot serializer. It is shifted by serializer clock D shown in FIG. 9, provided on shift input line 82. Serializer clock D is generated by gating circuit 84 from the link bit clock C and the line 1 slot time signal B. Gating circuit prevents the first bit clock pulse occurring at the beginning of the line slot time from being applied to the shift input of register 76. During this time, when clock 1(H) is active at the output 86 of contention logic 74, the content of deserializer register 78 is loaded into serializer register 76 through bus 88.

Then when clock 2(J) is active on output line 90 of contention logic 74, the variable validation pattern 100000000 stored in register 80 is loaded in deserializer register 78. Deserializer register 78 is a 9-bit shift register in which the received data bits provided by one bit buffer latch 72 are inputted through input 92 under control of modem clock receive resynchro clock 3(O) generated on output line 94 of contention logic 74. This clock 3 causes the data bit stored in latch 72 to be entered in register 78 and of the variable delimiter pattern to be shifted toward the right in register 78.

Thus when the line slot time signal becomes UP, the three following steps are performed:
  loading deserializer 78 into serializer 76
  loading the variable data delimiter into deserializer 76
  entering a new bit (if any) from modem into the data deserializer using the resynchronized modem clock 3, then, the data bits which are received until the next active line slot time signal, are inputted into the data deserializer 78. Thus when the next line slot time signal becomes active the data deserializer contains a number of valid bits which depends on the modem line speed and which is determined by the position of the variable delimitation pattern.

At that time the three steps described above are resumed.

The data bits in serializer 76 are shifted toward the right, under control of serializer clock D on line 82.

If there were eight valid data bits in register 78, the bit 1 of the variable delimitation pattern would have been shifted in the right most position of register 78 to be used as the global validation bit in the control slot associated with the data slot.

It will now be described how the control slot is built.

Modem control lines are associated to the modem data line. There are usually six control lines schematically represented as bus 100. The control bits on these six lines are stored in registers 102 and 104 to be placed in the E-bits positions of the control slot (see FIG. 6-A). Since, only four E bits are available per control slot, two frames are used to send the six control bits, for example four bits are sent in the odd numbered frames and two bits are sent during the even numbered frames.

Odd/even frame counter 106 which is controlled by the line 1 slot time signal on line 66-1 causes the content of the four control bits in register 102 to be loaded in control slot serializer register 108 during the control slot time of a odd numbered frame and the two remaining control bits to be sent to the serializer register 108 during the control slot time of a even numbered frame.

Control bits: G, TR, N and I are provided to control slot serializer 108 through register 110. G-bit is set in the left most position of register 110 to the value stored in the right most position R of register 78. Thus if the number of valid data bits in register 78 is lower than eight a 0 is stored in this position so that the G-bit in register 110 is set at 0.

If there are eight valid data bits in deserializer register 78, the left most bit (1) of the variable validation pattern is stored in the R position of register 78 and a 1 is stored as G-bit in register 110.

The TR bit is set through line 114 from the transmit part of the line interface circuit.

The I-bits are filled from line interface control internal registers 112. Assuming that there are eight 8-bit internal registers, 64 frames are required for placing the content of these registers, one bit at a time in the control slot assigned to the line user. The content of the internal registers is shifted in the I-position of register 110 under control of the line 1 slot time signal on line 66-1.

Frame counter 115 counts the number of frames from the frame synchro signal on line 7, so as to cause the N-bit to be set to 0 every frame out of 64 through line 116. This allows the beginning and the end of the transmission of the internal register content to be determined.

The internal registers are loaded through a scan/refresh mechanism which will be described in reference to FIG. 12.

The content of register 110 is loaded in control slot serializer shift register 108 under control of signal on slot line 1 time line 66-1 at the beginning of the time period assigned to the line, by means of clock 1(H) signal on line 86.

The data and control slot serializer registers 76 and 108 are serially connected and shifted under control of serializer clock signal (D) on line 82. This clock signal is inactive during the time, the registers are loaded.

Output 118 which provides the serial control and data bits is gated to the line interface circuit output 15, to be sent to multiplexing circuit 5 through AND gate 120 which is conditioned by the signal on line 66-1.

In the line interface circuit, similar arrangements are provided for each input line users. Only circuits 54, 64 and 50 are shared by the users connected to the line interface circuit.

The outputs of the AND gates 120 of the receiving arrangements of each user connected to the plurality of line interface circuits are OR dotted so as to provide the data and control bits from the users connected to the line interface circuits in the assigned time periods to multiplexing circuit 5.

The line interface circuit transmit part will now be described in reference to FIGS. 10 and 11 which show the circuits required for sending the data and control bits from multiplexing circuit 5 to the users and the corresponding timing diagram. It uses the same line slot time signals as the receive part.

Serializer shift register 200 providing the data bits to the user modem on line 202 through driver 204, during the time slot period assigned to the user, is to be loaded by the data bits coming from multiplexing circuit 5 on line 13. The data and control bits from multiplexing circuit 5 on line 13 are provided to data and control slot bit deserializer 206 at the bit clock rate (C in FIG. 9).

As shown in FIG. 11, a transmit clock pulse R (FIG. 14) is generated from the modem transmit clock P. This clock R is active during the next pulse provided by the phase lock oscillator following the leading edge of the modem transmit clock P. It is generated by single pulse generation circuit 208 which receives the modem transmit clock P through receiver 210 and the PLO output signal Q. Circuit 210 will be described in reference to FIG. 14.

At the line slot time signal end, the data bits and the G bit in register 206 are loaded in data register 212. The load pulse is provided by AND gate 214 and is active at the slot time end when there is an active transmit request on line 114.

The data register 212 contact is loaded in 9-bit serializer 200 under control of load pulse U (FIG. 11) on line 232.

Once loaded, the serializer content is shifted to the right at the rate of Xmit pulse Q provided to the shift input through AND gate 216. Zeroes are inputted to replace the data bits shifted to the right, this is schematically represented in the figure by the 0 on input 218.

To signal that the last bit has been sent, comparator 220 compares the content of serializer 200 with the pattern 00000001 indicating that the data slot is empty. Assuming that the data slot has the configuration 0001XXXX (four valid bits), G-bit is equal to 0. When bit 1 of the variable delimiter is located in the eight-th position of the serializer, comparator 220 detects an equality which means that the four data bits have been sent. If there is eight valid data bits in the data slot, G-bit is equal to 1, so that when G-bit is located in the eight-th position of the serializer, comparator 220 detects an equality which means that the eight data bits have been sent.

The output signal S of comparator 220 on output line 222 is provided to the D-input of D-latch 224 which receives the PLO output signal (line 226) on its clock CK inputs.

Latch 224 provides on its Q-output, comparator OUT delayed signal T. Signal T is provided at one input of AND gate 230 which receives on its second inout, transmit pulse R from line 234. Thus when the valid data bits have been sent, serializer 200 is loaded through active signal U.

When no equality is detected, AND gate 230 is not conditioned and signal U is inactive.

The Q-output of latch 224 is inverted in inverter 236, thus AND gate 216 is conditioned and transmit pulse signal R is provided to the shift input of serializer 200.

The transmit request bit TR is generated by D-latches 240 and 242. Latch 242 receives a 1 on its D-input and the load pulse from line 232 inverted in inverter 244. Thus it provides an UP active level on its Q-output on line 114 on the trailing edge of the load pulse (U in FIG. 11) on line 232, i.e. when data register 212 has been loaded in the serializer 200. Thus at that time the TR-bit is active.

At the next slot time end detected by AND gate 214, when the load data register pulse W becomes at an UP level, the clear request latch 240 is set on the next leading edge of the PLO pulses. The complemented output Q of latch 240 is connected to the CLEAR input of D-latch 242 so that at time latch 240 is reset and the TR-bit is at its inactive DOWN level.

The transmit request TR bit is sent to the receive part of the line interface circuit.

The control bits in the control slot deserialized in deserializer register 206 are processed in the following way.

At the slot time end, i.e. when the control and data bits relative to the line user are assembled in register 206, the G and N bits are loaded in register 244. The N-bit is used for delimiting the I bit stream which is accumulated in a plurality of frames and loaded in 8-bit deserializer 246.

The I bit of each control slot is provided at the input of deserializer 246, the content of which is shifted by the slot time end pulse on line 248. Deserializer register 246 feeds the internal control registers.

The E external control bits are loaded in register 250 and 252. The first four bits are loaded in register 250 and the remaining two bits are loaded in register 252. The register loading control pulses on lines 258 and 260 are provided by AND gates 254 and 256 which receive on one of their inputs the slot time end from line 248 and on their second inputs the odd frame indication and the even frame indication respectively provided by counter 106 shown in the receive part (FIG. 8). Thus register 250 is loaded during the odd numbered frame and register 252 is loaded during the even numbered frame.

The content of registers 250 and 252 are provided to the modem out control lines trough busses 262 and 264.

The scan/refresh mechanism will now be described in reference to FIG. 12.

It is assumed that eight 8-bits internal registers are provided in the line interface circuit per user. Only one I bit relative to one user is provided to this assembly of registers per frame, thus 64 frames are needed to complete the loading of these registers with the I-bits relative to the user.

Internal registers 300-1 to 300-8 are loaded with the I-bits from the receive control part of deserializer 206 and 8-bits deserializer 246 through bus 302. The content of registers 300-1 to 300-8 is transferred in 8-bits serializer 112 and control slot serializer 108 of receive part of the line interface control circuit through bus 304.

Figure 8A:
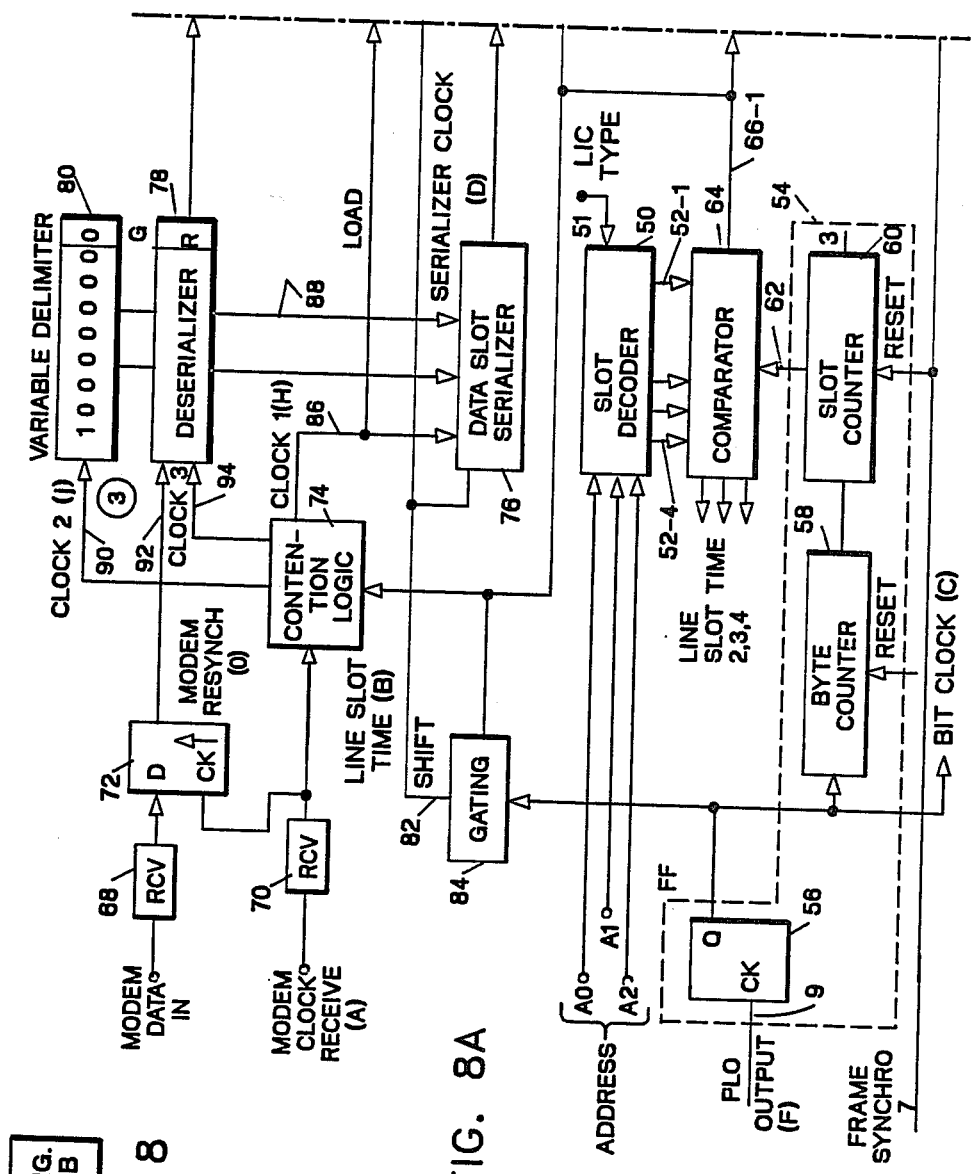
Figure 8B:
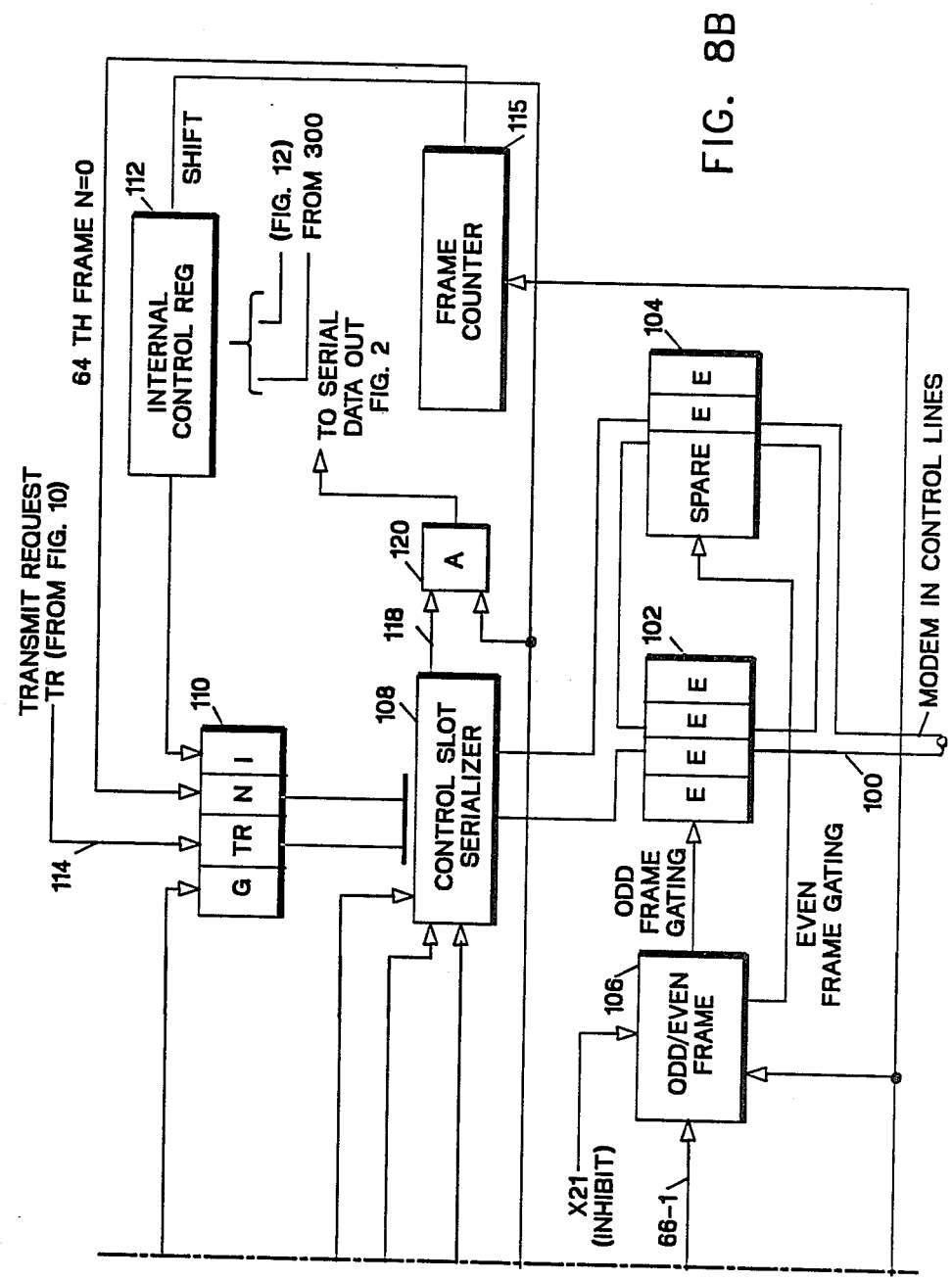

Frame counter 306 is connected to the output of byte counter 58 shown in FIG. 8. It counts the frames modulo 63. Decoder 308 generates from the output of counter 306 signals on its output lines 310 which are active during frames 0 to 63. For example signal on line 310-0 is active during frame 0 and signal on line 310-9 is active during frame 9.

Line 310-0, line 310-7, line 310-15 . . . to line 310-55 are connected to the read input of registers 300-1 to 300-8 respectively so as to cause the content of these registers to be sent on bus 304 when the signals on these output lines of decoder 308 are active.

Line 310-7, line 310-15, line 310-23 . . . to line 310-63 are connected to the write input of registers 300-1 to 300-8 so as to cause the content of deserializer 246 to be transferred in internal registers 300-1 to 300-8 when the signals on these output lines of decoder 308 are active.

Each time eight bits are counted by byte counter 58, timing circuit causes a loading pulse to be provided on output line 314. This causes the content of one of the internal registers depending upon which read lines is active to be provided to serializer 112.

During each frame from frame 0 to frame 7, eight I-bits are accumulated in deserializer 246. Whem frame 7 is decoded, write line 310-7 is active and the content of deserializer 246 is loaded into register 300-1. The same process occurs for frames 8 to 15, 16 to 23, 24 to 31, 32 to 39, 40 to 47, 48 to 55 and 56 to 63 for loading registers 300-2 to 300-8 when lines 310-15, 300-23, 300-31, 310-39, 310-47, 310-55, 310-63 are active.

The content of these registers 300-1 to 300-8 are transferred to serializer 112 when lines 310-0, 310-7, 310-15, 310-23, 310-31, 310-39, 310-47 and 310-55 are active.

Then as described in reference to FIG. 8, the bit which is shifted out of the serializer 112 is placed in the I-bit position of control slot serializer 108 of the receive part of the line interface circuit to be sent to the multiplexing circuit.

The N delimiting bit is set at 0 in deserializer 108, when frame 63 is decoded by decoder 308.

Figure 13:
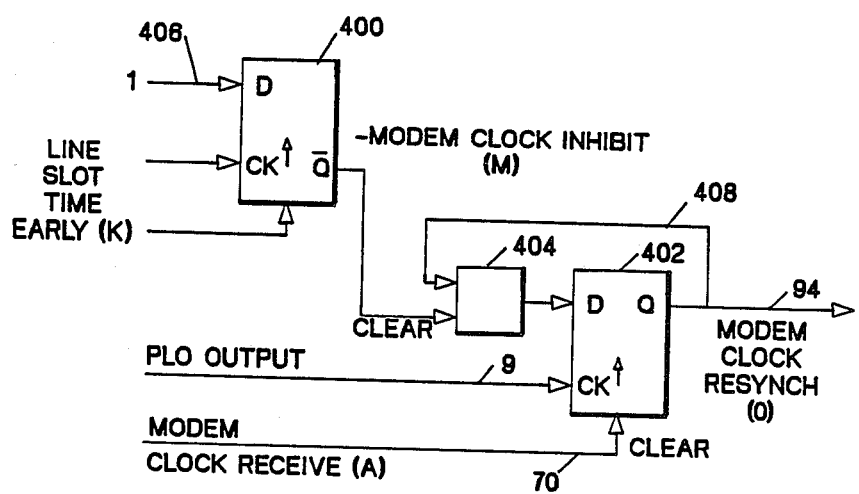
FIG. 13 shows the modem clock resynchro signal generating circuit of the receive part of the line interface circuit.

The circuit which allows the modem clock resynchro signal O in FIG. 9 to be generated is described in reference to FIG. 13.

It comprises two D-latches 400 and 402 and OR circuit 404. A 1 is provided on D-input 406 of latch 400 and data slot time early signal K is provided on the CK input. Latch 400 is reset by data slot time delayed signal L. The complemented $\bar{Q}$ output 408 of latch 400 is provided to one input of OR circuit 404. The other input of OR circuit 404 is connected to the Q-output 94 of latch 402. The CK-input of latch 402 is connected to the PLO output line 9 and its clear input is connected to the modem clock receive line at the output of receiver 70 (signal A in FIG. 9).

When the modem clock receive signal becomes at its UP level, the modem clock resynch signal goes UP at the next leading edge of the PLO pulse provided that the modem clock inhibit latch 400 is at its UP level. This modem clock inhibit latch 400 is used to delay the modem clock in the case of contention with the load serializer signal H. In this case the modem clock inhibit latch complemented output $\bar{Q}$ is set to its DOWN level at the leading edge of data slot time early signal K and set back to UP level by the data slot time delayed signal L. During the time the modem clock inhibit latch 400 complemented output is at DOWN level, the data slot serializer 76 is loaded with deserializer 78 content and then the variable delimiter is loaded in the deserializer 78. Then the next data bit coming from the one bit buffer 72 can be shifted into the deserializer 78.

Figure 10A:
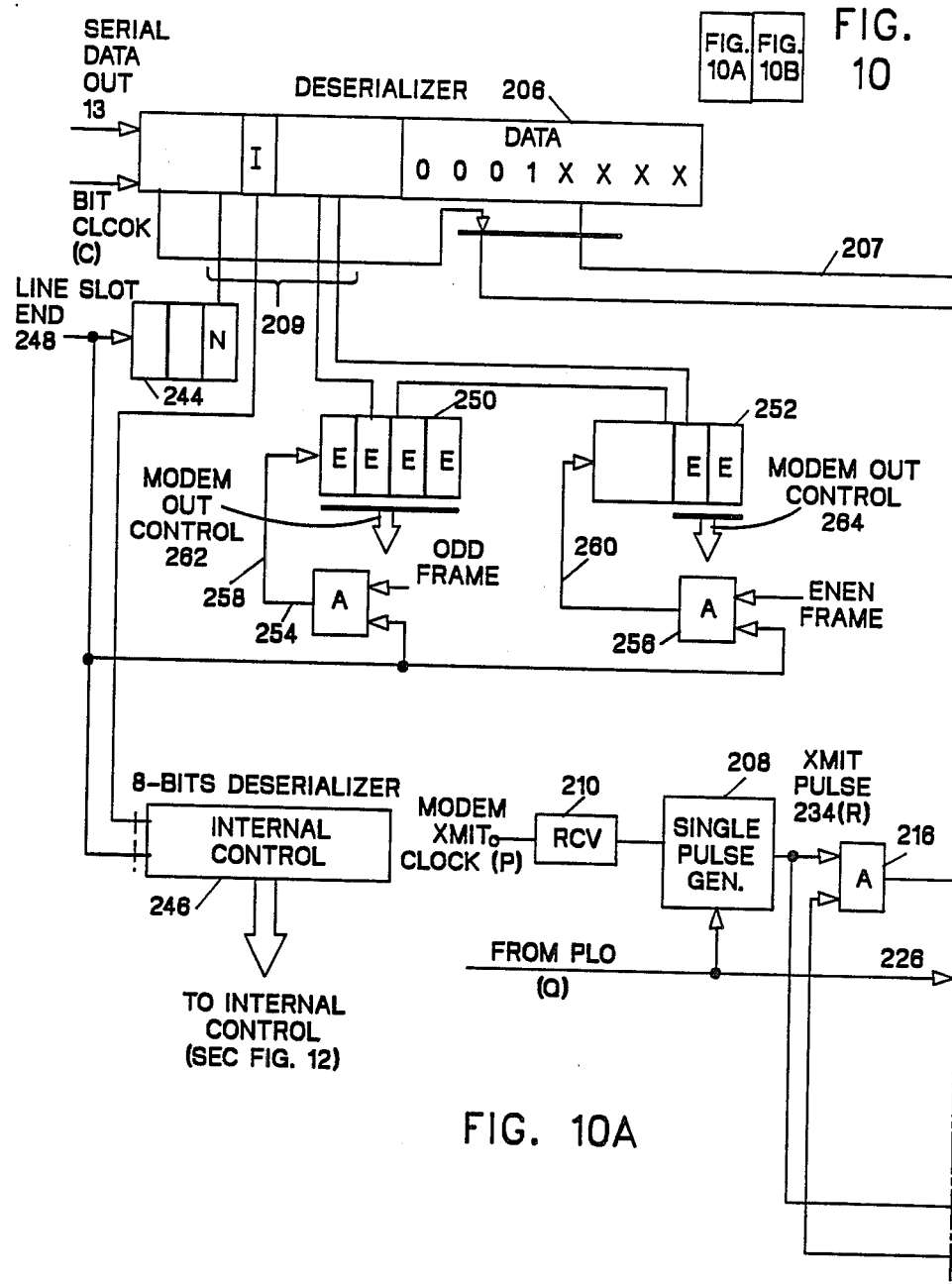
Figure 10B:
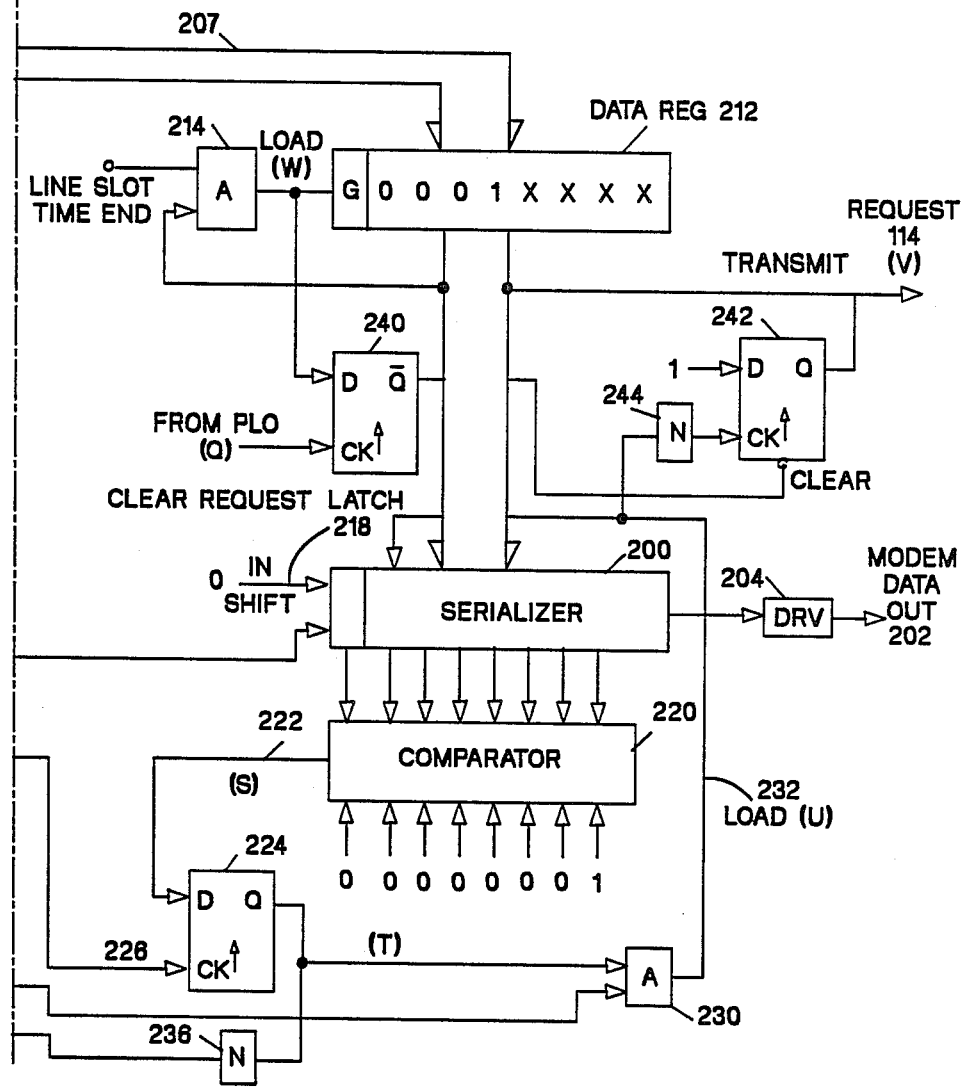
Figure 14:
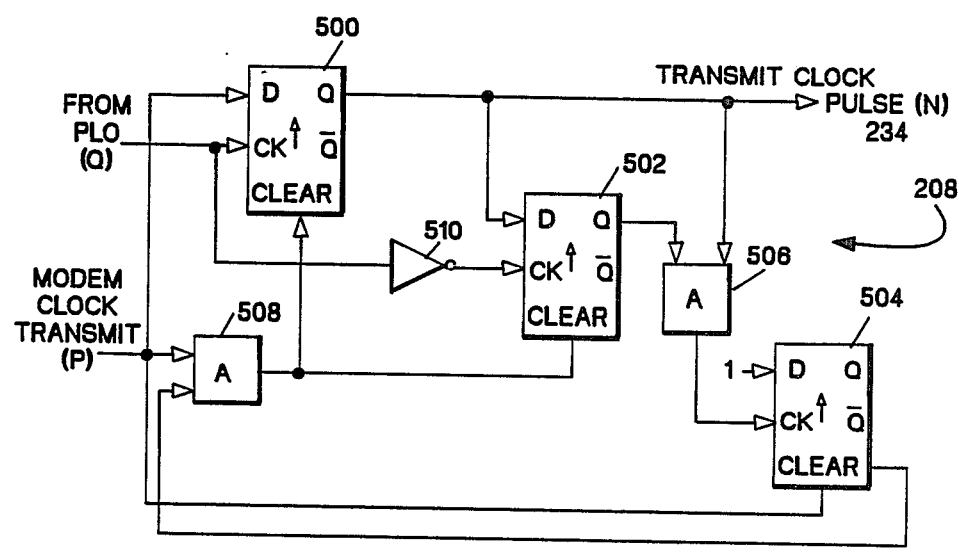
FIG. 14 shows the single pulse generating circuit 208 of the transmit part of the line interface circuit.

FIG. 14 represents the single pulse generating circuit 208 of FIG. 10. It generates the R transmit clock pulse from the modem transmit clock P and the PLO output signal Q. it comprises three D-latches 500, 502 and 504, AND gates 506 and 508 and inverter 510.

D-input of latch 500 receives the modem transmit clock signal P and its CK-input receives the PLO output signal Q. Output of latch 500 is connected to D-input of latch 502. CK-input of latch 500 receives the PLO output signal inverted by inverter 510. Output of latch 502 is connected to one input of AND gate 506. The other input of AND gate 506 is connected to the Q-output of latch 500.

The output of AND gate 506 is connected to the CK-input of latch 504, the D-input of which is set to 1. The complemented $\bar{Q}$ output of latch 504 is provided to one input of AND gate 508, the other input of which receives the modem transmit clock P signal. The clear inputs of latches 500 and 502 are connected to the output of AND gate 508 and the clear input of latch 504 receives the modem transmit clock P signal.

This arrangement allows one pulse from the PLO pulse stream to be provided on output line 234 taken at the output of latch 500 when the modem transmit clock signal is UP. This pulse which is provided to AND gate 506 prevents the following pulses from the PLO from being provided on output 234. Thus signal R is generated on output line 234.

It will now be described in reference to FIGS. 15 and 16 the receive and transmit part of the line interface circuit which is used for attaching the line scanning means to a digital multiplex line at 2.048 megabits per second such as T1 line using the CEPT framing.

In that case, the multiplexing circuit 5 is attached to one line interface circuit only and switches SW3 and SW4 are closed and switches SW1 and SW2 are open. This allows the frame synchro on line 3-R to be generated in synchronism with the frame synchro signal retrieved from the received data. To insure a perfect synchronism between the T1 channels and the two-slot periods on the multiplex link 3, the same frame synchro signal must be used in the transmit part on link 3-T and the T1 line and in the receive part on the T1 line and link 3-R. The bit clocks have to be in phase, the clock frequency on link 3 is twice the clock frequency on the T1 line since two eight-bit slots (data and control) correspond to one T1 channel (data or signalling). It is no more required to use the global validation bit in the control slot since there are always eight bits to be sent or received in each data slot. Consequently the G bit may be permanently coded in the control slot to 1 indicating that eight bits are valid in the data slot or this indication may be permanently provided to the line interface circuit and the G-bit position may be used for exchanging additional control information.

Thus the T1 line controls the frame synchro generation and the bit clock signal in receive and the line scanning means controls the frame synchro generation and the bit clock signal in transmit.

Consequently, the contention logic 74 shown in FIG. 8 is no more required in the receive part of the line interface circuit.

The data in bits are received from the T1 line by receiver 600. Phase locked oscillator retrieves the clock signal on the T1 line at a frequency equal to 16.324 megahertz in the chosen example. The output of PLO 602 is provided to a frequency divider made of two flip-flop circuits 604 and 606. Phase locked oscillator 600 output line constitutes line 9-R which is provided to the multiplexing circuit 5. The output of flip-flop 604 provides the link bit clock on line 608 and the output of flip-flop 606 provides the T1 bit clock on line 610. Link bit clock frequency is twice the T1 bit clock i.e. 8.192 and 4.096 MHz respectively.

T1 bit clock is provided to the shift input of deserializer 612 in which the received data bits are inputted by receiver 600.

The content of deserializer 612 is provided to a synchro pattern detection circuit 615 through bus 616. Circuit 614 works under control of the T1 bit clock signal and generates on its output line 7-R the frame synchro receive signal which is provided to multiplexing circuit 5. This signal is active when circuit 614 recognizes in deserializer 612 the synchro pattern which is sent in the channel 0 of the T1 line.

Byte counter 616 connected to flip-flop 618 generates a channel selection signal on line 620. Byte counter counts the link bit clock pulses from line 608. Each time the selection signal is active the content of deserializer 612 is loaded into link data slot deserializer 622.

The output of flip-flop 618 is provided to T1 channel counter 624 which provides active signals on output lines 626 and 628 when channel 1 and channel 16 are decoded. These channels are used for exchanging signalling information which is to be loaded in the E-bit position of the link control slots. Consequently, these signals are provided through OR gate 627 to gating circuit 630 which causes the content of deserializer 612 to be provided to control slot serializer 632 when the channel selection signal on line 620 is active.

Byte counter 616 and channel counter 624 are reset by the frame synchro signal from line 7-R.

Data slot serializer 622 and control slot serializer 632 are serially connected and shifted under control of the link bit clock signal on line 608, so as to provide the serial data and control bits to the multiplexing circuit 5 on link 15.

The I and N bits are loaded in the control slot as described in reference to FIG. 8. This mechanism is schematically shown in box 634 and is inhibited through inverter 636 when the signals on line 626 and 628 are active.

No TR bit is required as shown in reference to FIGS. 4-A and 4-B.

Figure 16:
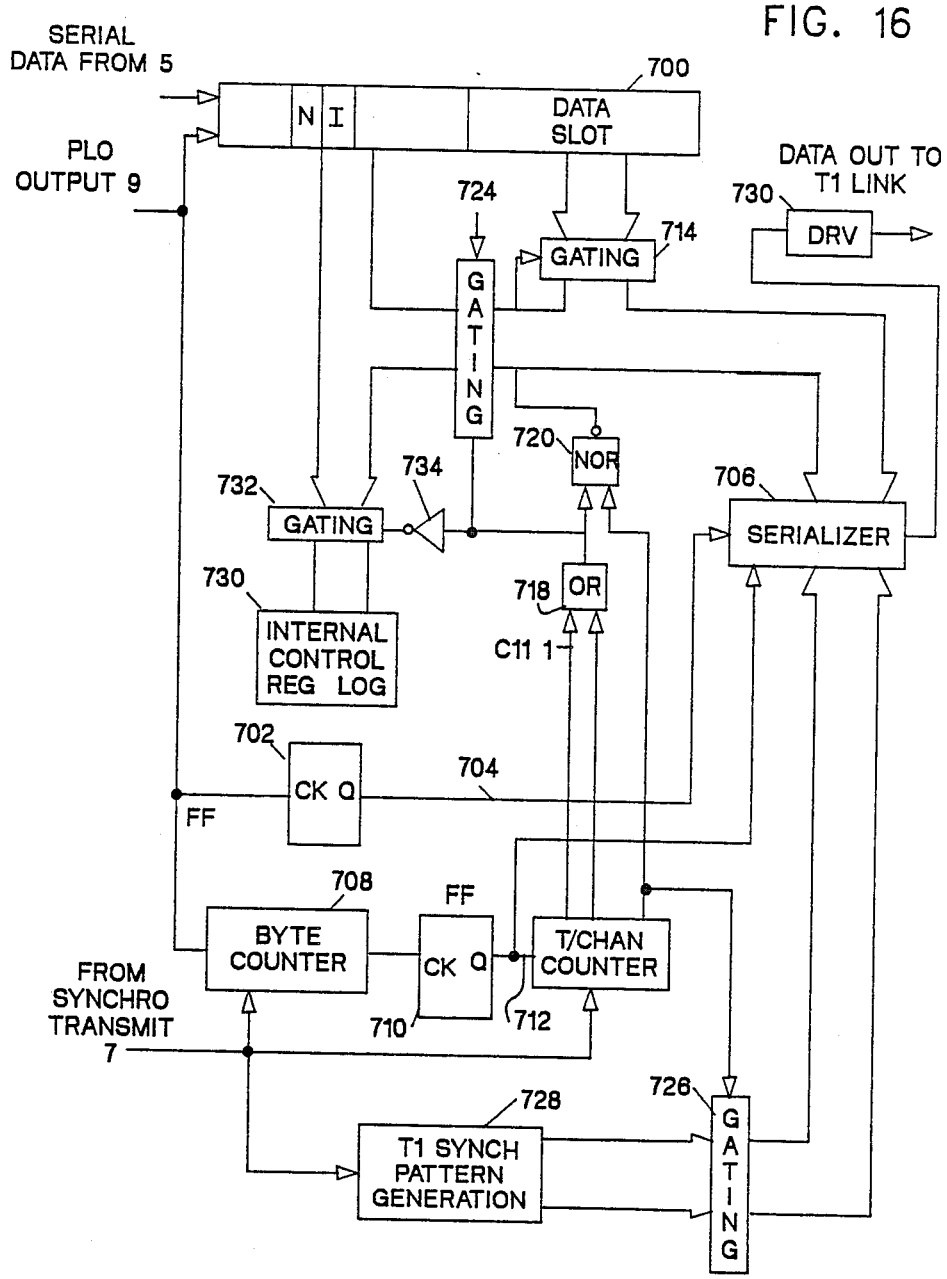
FIG. 16 shows the transmit part of the line interface circuit to be used for connecting the line scanning means to a multiplex user link.

The transmit part of the T1 line interface circuit is shown in FIG. 16.

It comprises control and data slot deserializer 700 which receives the serial data and control bits from transmit link 13 at the output of multiplexing circuit 5. The content of deserializer 700 is shifted under control of the PLO output signal on line 9 i.e. at a frequency of 8.192 MHz.

The PLO output signal is provided to flip flop circuit which provides on its output line a signal at a frequency equal to 4.096 MHz which is applied on the shift input of serializer 706 so as to cause serializer 706 to be shifted at the T1 bit rate.

The PLO output signal is also provided to byte counter 708, the output of which is applied to flip-flop 710 which provides on its output line a channel selection signal which is active to cause the content of the data slot in deserializer 700 to be loaded into serializer 706 through gating circuit 714.

When signalling channels 1 and 16 are decoded by channel counter 716 which is connected to the output of flip flip 710, the transfer of the data slot into serializer 706 is inhibited by means of the logic circuit comprising OR gate 718 and NOR gate 720.

The inputs of OR gate 718 are provided with the channel 1 and channel 16 indications from counter 716 and the inputs of NOR gate 720 are provided with the output of OR gate 718 and channel 0 indication from counter 716. Thus when channel 1 or channel 16 is decoded, gating circuit 714 is inhibited and gating circuit 724 is provided with an active gating signal which causes the content of the external control bits E in the control slot to be transferred into serializer 706.

When channel 0 is decoded, gating circuit 714 is inhibited so that the data slot content is not transferred to serializer 706. Gating circuit 726 causes the synchro pattern which is generated in frame synchro pattern generation circuit 728 under control of the frame transmit control signal on line 7 to be sent to serializer 706.

The bits shifted out of serializer 706 are provided through driver 730 to the T1 link.

Figure 12:
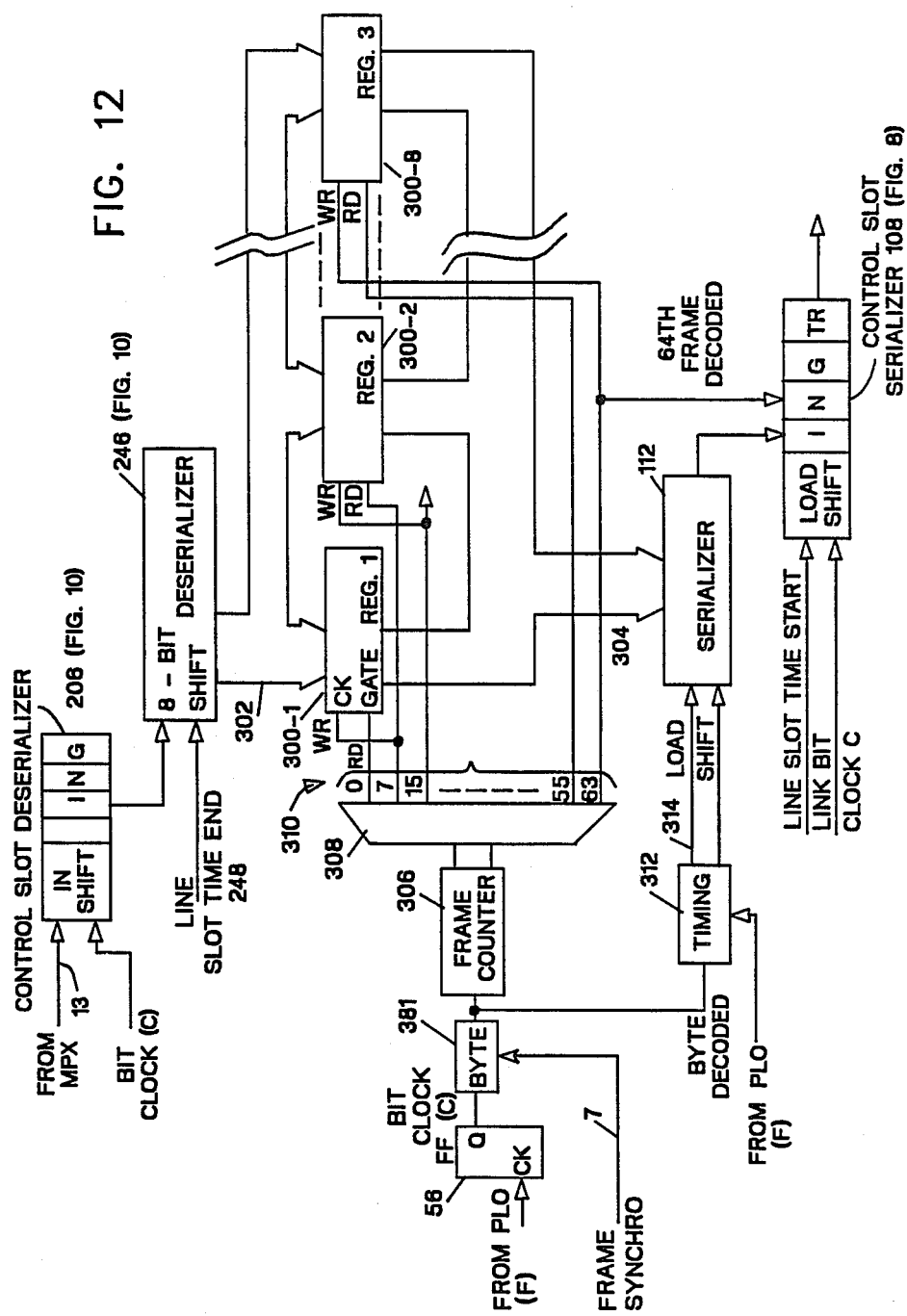
FIG. 12 shows the scan and refresh circuit used for arranging the bits to be exchanged in the control slots.

The I control bits are processed in the way described in reference to FIG. 12. This is schematically shown by logic 730. I-bits are provided to the internal control logic through gating circuit 732. The output of OR gate 718 is inverted in inverter 734. Thus, when channel 1 or channel 16 is decoded, the transfer of I-bits to logic 730 is inhibited.

Figure 15:
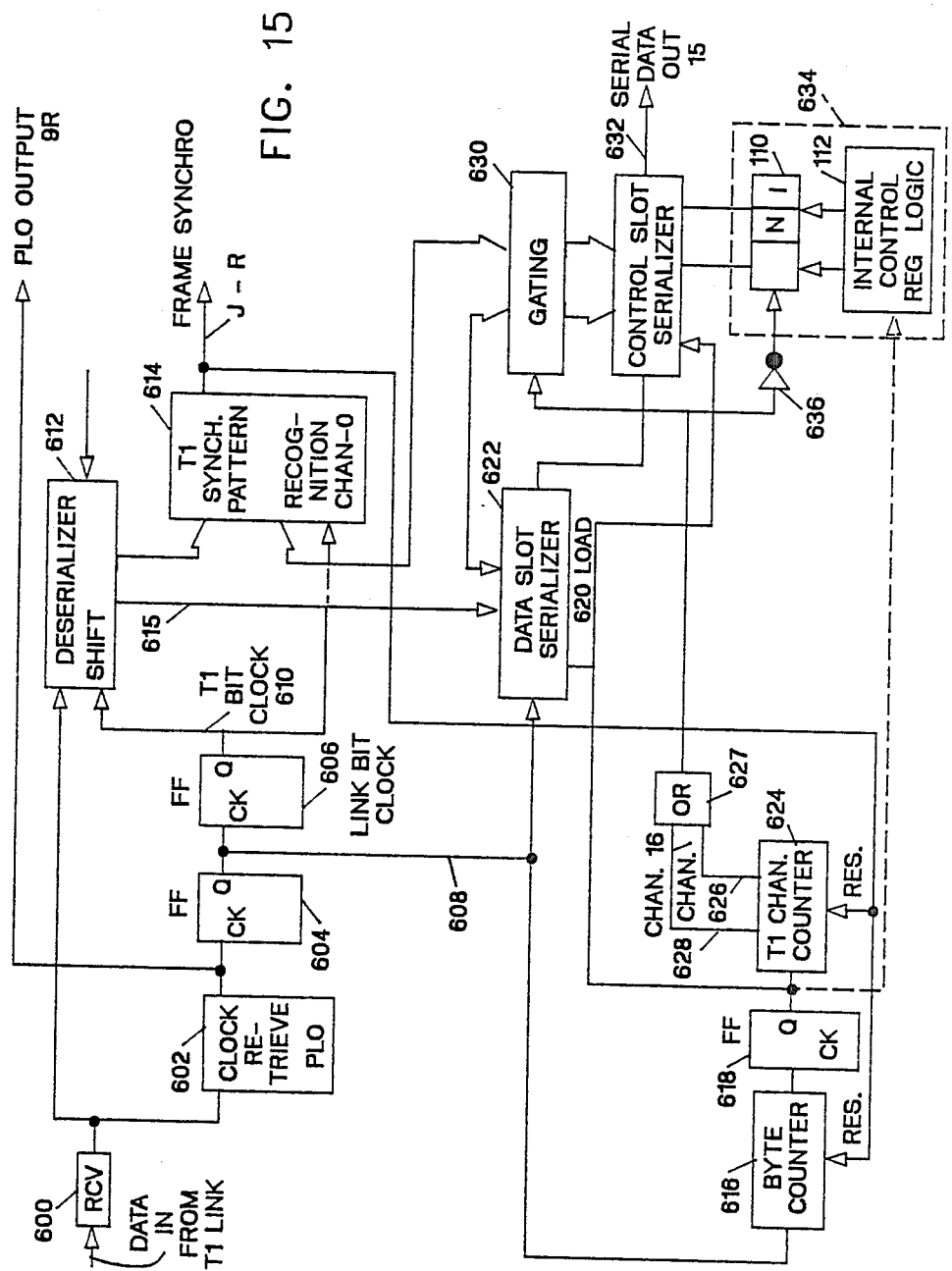
FIG. 15 shows the receive part of the line interface circuit to be used for connecting the line scanning means to a multiplex user link.

Two different types of receiving and transmitting means have been described in detail in reference to FIGS. 8 and 15 and to FIGS. 10 and 16, allowing the line scanning means to be attached to a modem user and to T1 type user, it will be easy for the man skilled in the art to implement the receiving and transmitting means allowing the line scanning means to be attached to other types of users.

We claim:

1. A multiplex interface (17,3) for interconnecting a line scanning means (1) of a communication controller, in order to exchange data and control bits, to user lines attached to the communication controller, characterized in that said multiplex interface comprises:
  transmit and receive synchronous multiplex links (3-T,3-F) connecting the line scanning means to the users through multiplexing means (17), the data and control bits being exchanged on the transmit and receive multiplex links in synchronous frames wherein at least two slots are assigned to each user, the structure of the two slots being identical for all types of users and comprising:
    an n-bit data slot which includes a variable number x of valid bits depending upon the speed of the user information carrying medium (line or multiplex link) assigned to the data slot, said number being indicated by a variable delimitation pattern comprising a first delimiting bit set at a first binary value (1) adjacent to the data bits and (n−x−1) bits set at the second binary value (0) adjacent to said first delimiting bit; and
    an n-bit control slot wherein a first bit is used as global validation bits in case the data slot comprises n valid bits (x=n), this bit being set at the first binary value (1) when the data slot comprises n valid bits and at the second binary value (0) if it comprises less than n valid bits, and the n−1 other bits being used for exchanging control information;
  said multiplexing means including:
    frame synchronization detecting means (30, 32) responsive to the bit stream on at least one multiplex link (3-T or 3-R) for generating therefrom a frame synchronization signal delimiting the succession of slots in the successive frames and a bit clock signal at the bit rate on the multiplex link;
    slot time allocating means (54, 50) responsive to the bit clock signal and to the frame synchronization signal for generating selection signals (66) which are active to indicate the two slot periods assigned to the users;
    at least one receiving means, each one of the receiving means (FIG. 8) receiving the data and control bits from one attached user at the speed of the user information carrying medium and arranging them into entities having the structure of the data and control bit slots to be sent on the receive link (3-R), said entities being sent to the line scanning means when the selection signal relative to the user is active;
    at least one transmitting means (FIG. 10), each one of the transmitting means receiving the bits from the transmit link arranged in data and control slots and responsive to the selection signal relative to the user for causing the valid data bits and the control bits to be sent to the user at the user information carrying medium speed.

2. Multiplex interface according to claim 1, characterized in that each receiving means comprises:
  data receiving means (68, 72, 70) which receives the user line data at the line bit rate,
  means (80) for storing a variable delimitation pattern comprising a first bit at the first binary value adjacent to n−1 bits at the second binary value,
  deserializing means (78) connected to the data receiving means for assembling the data bits received from the user line,
  data serializing means (76) comprising a n-bit shift register the content of which is shifted at the link bit clock signal rate, control means (74) for causing the deserializing means content to be loaded into the data serializing means and the variable delimitation pattern to be transferred into the deserializing means when the selection signal relative to the line user becomes active and for shifting the deserializing means content at the line bit rate, gating means (84) responsive to the line selection signal and to the link bit clock signal for generating an output signal which is applied to the serializing means for causing the content of the serializing means to be shifted at the link clock signal rate except during the first link clock pulse of the link clock signal following the time when the line selection signal becomes active.

3. Multiplex interface according to claim 2, characterized in that the receiving means comprise:
control bit receiving means (102, 104, 110) receiving the control bits from the user line which are associated to the data bits,
control bit serializing means (108), receiving the control bits when the line selection signal becomes active and the content of which is shifted under control of the output signal from the gating means, said control bit serializing means connected to the output of the data serializing means and providing on its output the serial data and control bits to be sent to the receive link when the selection signal is active.

4. Multiplex interface according to claim 3 characterized in that the control slot comprises positions to exchange:
the global validation bit (G)
a transmit request bit (TR) which is set at an active level in the control slot to be sent to the line scanning means when all data bits in a slot have been transmitted, to cause a new data bit slot to be sent on the transmit link,
at least two internal control bits (N, I) which are used for transmitting control information to the line scanning means,
at least one external control bits (E) which are used to receive or send control bits to the user lines in synchronism with the data bits which are received or sent.

5. Multiplex interface according to claim 4, characterized in that the deserializing means of the receiving means is a (n+1) stage shift register, the (n+1)th stage of which is taken as the global validation bit of the control slot.

6. Multiplex interface according to any one of claim 1 to 5, characterized in that the transmitting means comprises at least one deserializing means (206) which receive serially the data and control bits from the line scanning means and which provides the assembled data and control bits on a data output bus (207) and a control output bus (209) and for each user line:
data register means (212) which is loaded with the data bits and the global validation bit from the output busses of the deserializing means at the end of the active period of the line selection signal,
serializing means comprising a n+1 shift register which is loaded with the data register means content and the content of which is then shifted at the user line speed to provide the valid data bits contained in the data slot to the user line, means (232, 224, 230) for detecting that all valid data bits have been sent for causing the serializing means to be loaded with the data register content,
means (240, 242) responsive to the means for detecting that all valid bits have been sent for setting the transmit request bit (TR) on the control slot to be sent on the receive link (3-R).

7. Multiplex interface according to claim 6, characterized in that the means for detecting that all valid data bits have been sent comprise:
a comparator (220) which compares the content of the serializing means with the variable delimitation pattern indicating that a data slot contains no valid data bit,
first logic control means (224, 236, 216) responsive to the comparator output signal for preventing the serializing means to be shifted when the comparator indicates an equality,
second logic control means (230) responsive to the comparator output signal for causing the content of the data register means to be loaded into the deserializing means when the comparator indicates an equality.

8. Multiplex interface according to claim 7, characterized in that it comprises latching means (240, 242) responsive to the output signal of the comparator for setting the transmit request control bit (TR) in the control slot on the receive link when the comparator indicates an equality.

9. Multiplex interface according to claim 1, characterized in that only one receiving means receives the data and control bits from a multiplex user link in a plurality of user channels and comprises:
deserializing means (612) to which the bits from the multiplex user link are provided and shifted at the multiplex user link speed, the frame synchronization detecting means (614) being responsive to the deserializing means content for generating the frame synchronization signal delimiting the slots in the successive frames on the receive multiplex link,
data slot serializing means (622) comprising a n-bit shift register which is loaded at each channel period with the deserializing means content under control of the selection signals provided by the slot time allocating means (616, 618) and the content of which is shifted at the link bit clock rate, said data slot serializing means providing at its output, the data bits to be sent in the data slots on the receive multiplex link,
means (624, 627) responsive to the deserializing means content for recognizing the channels containing external control information and providing an active output signal when said channels are recognized,
control slot serializing means (632) comprising a n-bit shift register, the content of which is shifted at the clock bit rate,
gating means (630) for loading the deserializing means into the control slot serializing means when the means recognizing the channels containing control information generate an active output signal.

10. Multiplex interface according to claim 9 characterized in that only one transmitting means performs the transmission of the data and control bits from the multiplex transmit link to the multiplex user link and comprises:

deserializing means (700) to which the data and control bits from the multiplex transmit link are provided and in which they are shifted at the multiplex link bit clock rate, serializing means (706) comprising a n-bit shift register which is loaded at each channel period with the deserializing means content under control of the selection signals provided by the slot time allocation means (708, 710) and providing on its output the bits to be sent on the multiplex user link, means (716, 714, 728, 726) recognizing the channels in which control bits have to be sent to prevent the data bit content of the deserializing means from being loaded into the serializing means and causing the control bits to be loaded into the serializing means to be sent to the multiple user link.

* * * * *